A. N. GODDARD.
MILLING CUTTER.
APPLICATION FILED JAN. 2, 1919.
1,311,686. Patented July 29, 1919.
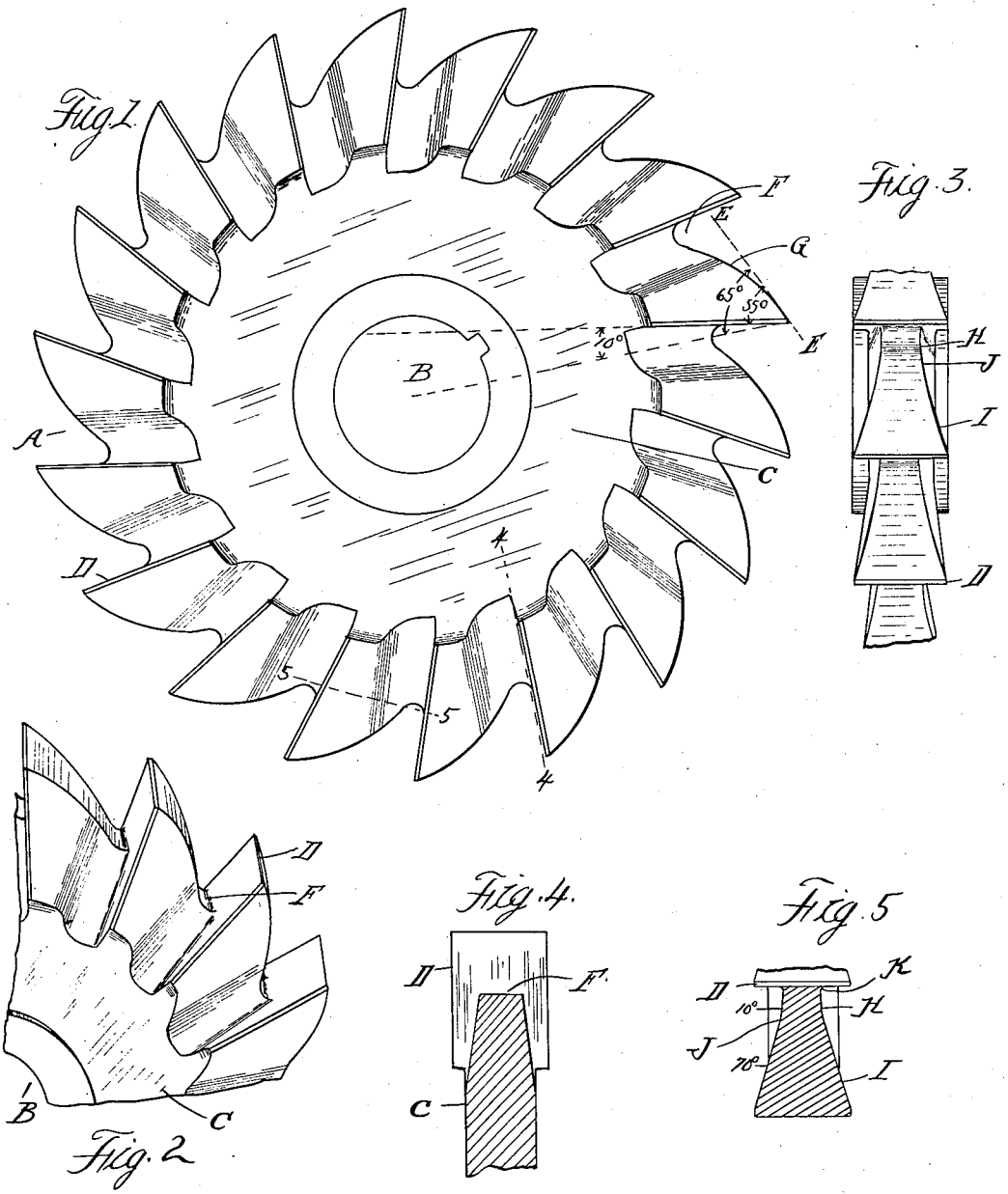
Inventor
Archibald N. Goddard
By Whittemore Hulbert Whittemore
Attorneys

UNITED STATES PATENT OFFICE.

ARCHIBALD N. GODDARD, OF DETROIT, MICHIGAN.

MILLING-CUTTER.

1,311,686.  Specification of Letters Patent.  Patented July 29, 1919.

Application filed January 2, 1919. Serial No. 269,204.

*To all whom it may concern:*

Be it known that I, ARCHIBALD N. GODDARD, a citizen of the United States of America, residing at Detroit, in the county of Wayne and State of Michigan, have invented certain new and useful Improvements in Milling-Cutters, of which the following is a specification, reference being had therein to the accompanying drawings.

The invention relates to metal cutting tools of the type known as milling cutters and which consists in circular blanks notched to form a series of cutting teeth. It is the usual practice to form the teeth by cutting, the blank thereof forming both the cutting edge of the tooth and the necessary clearance in rear thereof for receiving the chips or shavings removed from the work. If the angle of the tooth is too sharp the strength is greatly diminished and also the tooth is rapidly cut away in re-sharpening. On the other hand, some clearance is absolutely essential and the greater the clearance is the less danger of clogging by accumulated ships or shavings. It is therefore the practice to select an angle which is an average between the two extremes, but the results obtained are not always as satisfactory as might be desired.

It is the object of the present invention to obtain greater clearance without either diminishing the strength of the tooth or the stock for re-grinding, and this I have secured by cutting with a changing angle. Specifically, the portion of the tooth immediately in the rear of the cutting edge is formed at an angle providing minimum clearance and greater strength, while the rear portion of the tooth is formed at a sharper angle so as to increase the clearance to accommodate the ships. There is not, however, any abrupt change in angularity, as this would form a pocket tending to clog the tooth; but by uniting the two angular portions with a curve which is tangent to both such pocket is avoided.

In the drawings:

Figure 1 is a side elevation of a milling cutter of my improved construction;

Fig. 2 is a perspective view of a portion of the cutter;

Fig. 3 is an edge elevation thereof;

Fig. 4 is a section on line 4—4 of Fig. 1;

Fig. 5 is a section on line 5—5 of Fig. 1.

A is a substantially circular blank forming my cutter, having a central bore B for mounting on the arbor or spindle. As shown, the tool is designed for cutting on its sides as well as peripherally, and to this end, the opposite sides are provided with annular recesses C, leaving outer annular portions of greater width which are notched to form the teeth.

The cutting edges of the teeth are formed by faces D which are preferably inclined a small amount, such for instance as 10° from a radial line. These surfaces D extend completely across the tooth at the periphery and also extend inward at each side until merging into the annular recesses C. The portion of the tooth immediately in rear of the cutting face D and at the periphery of the cutter extends at a minimum clearance angle, such for instance as 55° to the surface D, or 65° to a radial line. If this same angle were continued rearward to the face D of the next adjacent tooth it would form a line, as indicated by the dotted line E—E, which is the common form of milling cutter. I have, however, modified this construction by cutting in front of each tooth a deep notch F and at an angle to the surface D much sharper than that formed by the line E—E. The two angular portions are then joined by a curve G tangent to both angular portions so as to form a smooth unobstructed surface. At the bottoms of the notches F I prefer to form a small fillet joining the curved back of each tooth to the flat front of the following tooth.

In cutting the side teeth a suitable angle, such for instance as 70°, is formed, with the front face D in the portion of the tooth immediately in rear thereof. This angle if continued to the front of the next adjacent tooth would cut deeply into the stock of the blank and would also form an acute angular pocket, in which the chips or shavings would accumulate. I, therefore, change the angle of the rear portion of the side of the tooth to form a less acute angle to the front face of the adjacent tooth, as indicated at H, and the two angular portions H and I are connected with a curve. Also a fillet K is formed at the rear of the pocket between the face H and the front face D of the adjacent tooth. In transverse section, and as shown in Fig. 4, the surfaces H and J are tapered toward the periphery.

With the construction as described the tool in operation will free itself from chips or shavings, first, because of the increased depth of pocket on the periphery of the cutter formed by the two portions in angular relation to each other; and second, by the curve connecting these angular portions so as to avoid any obstruction. At the same time the cutting edge of the tooth is strongly reinforced and sufficient stock is left to permit of re-grinding and sharpening without rapid alteration in size. The clearance spaces at the sides of the tooth are also of two angles connected by a curve and have the effect of providing space for the chips and shavings and a smooth unobstructed surface over which they can travel out of engagement with the cutter. Thus, by changing the usual straight face to the two angles and curve I secure strength of tooth combined with abundant clearance and freedom from any obstruction to the chips or shavings.

What I claim as my invention is:

1. In a milling cutter, a tooth having portions thereof adjacent to the clearance spaces at different angles connected by a curve to which the respective portions are tangents.

2. In a milling cutter, a tooth having its clearance space at a predetermined angle adjacent to the cutting edge and at a different angle in rear thereof, the two angular portions being connected by a curve to which they are respectively tangents.

3. In a milling cutter, a tooth having a portion thereof adjacent to the cutting edge at an acute angle with restricted clearance and a portion in the rear of the first mentioned portion and adjacent to the front of the next following tooth at a more acute angle than the first mentioned portion, said angular portions being connected by a curve.

4. In a milling cutter, a tooth having its top adjacent to the cutting edge at an acute angle to the face of the tooth and a portion of the back of the tooth in the rear of the first mentioned portion and adjacent to the front of the following tooth at a more acute angle, the space between such angular portions being at a more acute angle than the top and at a less acute angle than the second mentioned portion of the tooth.

5. A milling cutter having teeth formed with flat faces inclined forwardly at an angle of substantially ten degrees from radial planes, and with tops forming an angle of substantially sixty five degrees with the radial planes, the backs of the teeth being curves to which their tops are tangential.

In testimony whereof I affix my signature.

ARCHIBALD N. GODDARD.